US006905139B2

United States Patent
Akahane et al.

(10) Patent No.: US 6,905,139 B2
(45) Date of Patent: Jun. 14, 2005

(54) CONSTRUCTION EQUIPMENT MACHINE

(75) Inventors: Eiji Akahane, Tokyo (JP); Makoto Sakai, Tokyo (JP)

(73) Assignee: Shin Caterpillar Mitsubishi Ltd., Tokyo (JP)

( * ) Notice: Subject to any disclaimer, the term of this patent is extended or adjusted under 35 U.S.C. 154(b) by 0 days.

(21) Appl. No.: 10/297,831

(22) PCT Filed: Feb. 27, 2002

(86) PCT No.: PCT/JP02/01801

§ 371 (c)(1),
(2), (4) Date: Dec. 11, 2002

(87) PCT Pub. No.: WO02/099205

PCT Pub. Date: Dec. 12, 2002

(65) Prior Publication Data

US 2003/0150138 A1 Aug. 14, 2003

(30) Foreign Application Priority Data

May 31, 2001 (JP) .................................. 2001-165317

(51) Int. Cl.$^7$ .............................................. B65D 1/00
(52) U.S. Cl. ..................... 280/831; 280/832; 280/834; 220/564
(58) Field of Search .............................. 280/831, 832, 280/834; 220/562–564; 428/35.7, 36.6, 36.7

(56) References Cited

U.S. PATENT DOCUMENTS

| 3,984,141 | A | * | 10/1976 | Gilette et al. | 296/203.01 |
|---|---|---|---|---|---|
| 4,506,756 | A | * | 3/1985 | Bergous | 180/291 |
| 4,925,712 | A | * | 5/1990 | Cicuta et al. | 428/35.7 |
| 5,314,733 | A | * | 5/1994 | Saito et al. | 428/36.6 |
| 5,728,423 | A | * | 3/1998 | Rogerson | 427/231 |
| 5,746,961 | A | * | 5/1998 | Stevenson et al. | 264/255 |
| 5,762,232 | A | * | 6/1998 | Green et al. | 220/564 |
| 5,928,745 | A | * | 7/1999 | Wood et al. | 428/36.6 |
| 6,448,341 | B1 | * | 9/2002 | Kolthammer et al. | 525/240 |
| 6,630,216 | B2 | * | 10/2003 | Pophusen et al. | 428/35.7 |

FOREIGN PATENT DOCUMENTS

| JP | 59-163663 | 11/1984 |
|---|---|---|
| JP | 2-6758 | 1/1990 |
| JP | 2-119453 | 7/1992 |
| JP | 11-138096 | 5/1999 |
| JP | 2000-203588 | 7/2000 |

* cited by examiner

Primary Examiner—Lesley D. Morris
Assistant Examiner—L. Lum
(74) Attorney, Agent, or Firm—Morrison & Foerster LLP

(57) ABSTRACT

The present invention relates to a construction machine in which a superstructure is rotatably mounted on an undercarriage, and is made up of an undercarriage (101) having a hollow frame (104), a superstructure (102) mounted on the undercarriage (101) and a fuel tank (1) formed as one with the hollow frame (104) in a state where a portion of an internal space of the hollow frame (104) is defined as a compartment by partitions (2), with an internal surface of the fuel tank (1) being covered with a resin film (3) in a liquid-tight condition.

3 Claims, 7 Drawing Sheets

CONSTRUCTION EQUIPMENT MACHINE

TECHNICAL FIELD

The present invention relates to a construction machine in which a superstructure is rotatably mounted on an undercarriage.

BACKGROUND ART

In general, a construction machine is made up of an undercarriage which takes charge of a movement of a machine body and a superstructure mounted on the undercarriage for holding a working device, a power plant, a control/operating device therefor, an operator cab, and others, and so far, a fuel for an engine acting as a power source has been designed to be supplied from a fuel tank located on the superstructure.

A description will be given of, for example, a hydraulic excavator representative of this type of machine. As shown in a perspective view of FIG. 7, the hydraulic excavator is equipped with an undercarriage 101 and a revolving superstructure (superstructure) 102. The undercarriage 101 is of a crawler type, and is made to move the entire hydraulic excavator forwardly/backwardly or change its moving direction by independently rotating right and left running hydraulic motors 114 and 115 simultaneously/alternately for operating sprocket wheels 120 connected thereto and crawlers 121 wound on the sprocket wheels 120.

The revolving superstructure 102 is mounted on the undercarriage 101 through a revolving bearing, not shown, to be revolvable. This revolving superstructure 102 is equipped with a revolving frame, not shown, and at the front side of this revolving frame, there are placed operating cylinders, link devices and others, and further, there are located a front attachment 118 comprising a bucket, an arm, a boom and others and acting as a working device.

Over the entire top surface of the revolving frame, there are mounted a power plant 111, a hydraulic oil tank 112, a fuel tank 113, an operator cab 124 and accessory equipment for controlling/distributing power such as a pressurized oil in the power plant 111 and for carrying out various types of operations.

In addition, these equipment are operated through the use of an operating device situated in the operator cab 124 to control various types of motors and power of pressurized oil supplied under pressure to working cylinders for controlling the operation of the front attachment 118, the revolving operation of the revolving superstructure 102 with respect to the undercarriage 101 and forward/reverse rotation or stop of the hydraulic motors 114 and 115, thereby accomplishing predetermined operations.

A description will be given hereinbelow of a piping system. As shown in FIGS. 7 to 10, on a central portion of an upper surface of a main frame 104 provided for fixedly securing right and left truck frames 103 and 103 into a predetermined related configuration, a swing circle 105 is fixed to firmly support and set a revolving bearing. Moreover, in a hole made at the central portion of the swing circle 105, a swivel joint 106 comprising an inner cylinder 106a and an outer cylinder 106b (see FIG. 10) is located so that its axis coincides with the axis of rotation of the revolving bearing, and these inner cylinder 106a and outer cylinder 106b are in a rotatably and loosely inserted relation, and oil passages constituting a plurality of systems are independently connected thereto at all times. Still moreover, the other end portion of each of these oil passages is made to be connectable to an external line, and the inner cylinder 106a is provided as one with the revolving superstructure 102 side while the outer cylinder 106b is provided with the undercarriage frame 101 side, with they being made to be rotationally movable with respect to each other.

In addition, as FIG. 10 shows, the power of the power plant 111 on the revolving superstructure 102 is transmitted in a manner that a pressurized oil is supplied/returned through the swivel joint 106 to the running hydraulic motors 114 and 115, and pipes 116 and 117 thereof are built in the undercarriage frame 101. In the inner cylinder 106a, pipes for pressurized oils and returned oils are provided between it and a pressurized oil control device of the power plant 111, and on the outer circumference of the outer cylinder 106b, running pipes 116 and 117 are placed, which extend to the rear side of the undercarriage, that is, toward the locations of the sprocket wheels 120. The pipes are independently connected to entries, drain ports, signal ports and others through pressurized oils of the right and left hydraulic motors 114 and 115. The plurality of running pipes 116 and 117, each positioned close to the ground, are bent into a complicated configuration for avoiding a crash against an obstacle on the ground which has not been put in a good condition, and are protected by hollow portions and inside portions of the main frame 104 and the truck frame 103.

Meanwhile, at predetermined positions on the revolving superstructure 102, in addition to a strongly-built bracket for the setting of the front attachment 118, the power plant 111, the hydraulic oil tank 112, the fuel tank 113 and the operator cab 124, there are tightly placed a bonnet belonging to the aforesaid power plant 111, a control unit and a revolution actuators. Moreover, for example, for the improvement of habitability of the operator cab 124, the operator cab 124 is made to have a construction excellent in fully hermetic sealing, dustproof and soundproof and, therefore, the operator cab 124 tend to increase accordingly in size. Still moreover, in a case in which an air conditioning system and others are put in the interior of the operator cab 124, the operator cab 124 is required to have a larger space.

However, due to the relationship between the size of the machine body and the operating capability, limitation is imposed on the outside dimensions of the revolving superstructure 102. In addition, the upgrading of such a type of machine is in rapid progress, and most of automatic control units or associated equipment newly added for the extension of its operating capability require securing a location space on the revolving superstructure 102. Accordingly, there is a need to transfer a part of the equipment/devices, located on the revolving superstructure 102, to another place.

In this case, on the revolving superstructure 102, other than the operator cab 124, the spaces the power plant 111, the hydraulic oil tank 112 and the fuel tank 113 occupy are large, while, from the point of view of the relationship in connection between equipment or efficiency, for the practical use without impairing the operating capability of the machine, it is preferable that, of these equipment, any one of the hydraulic oil tank 112 and the fuel tank 113 is transferred to another location. In particular, in view of the function and efficiency, it is most preferable to transfer the fuel tank 113.

As an example of transferring the fuel tank 113 to the undercarriage as mentioned above, there has been known a technique disclosed in Japanese Utility Model Registration No. 2549354. According to this technique, a fuel tank 107 is accommodated in an inside space between a swing circle 105 and a main frame 104 independently of the main frame 104 as shown in FIGS. 8 and 9, and is constructed as a box-like hollow tank shaped into a doughnut configuration where a broken portion is made in a part of a ring. Moreover, in order to prevent the fuel tank 107 from interfering with running pipes 116 and 117, the fuel tank 107 is configured to surround only approximately a semicircle of a swivel joint 106, and the swivel joint 106 and the running pipes 116 and 117 connected as oil passages to running hydraulic motors 114 and 115 acting as running actuators are fixedly accommodated in the aforesaid broken portion in a state related to each other.

However, since the fuel tank proposed in the foregoing device is accommodated, independently of the main frame 104, in a small area forming an inside space between the swing circle 105 and the main frame 104 which are the structures of the undercarriage, a problem exists in that it is impossible to sufficiently use the space of the undercarriage 101.

On the other hand, although there is an idea in which a structure itself of the undercarriage 101 is made as a fuel tank, difficulty is encountered in preventing the interior of the tank from getting rusty, and in a case in which a crack occurs in the structure in a severe field, there is a possibility that the fuel flows out. Moreover, in this case, there is a problem that dusts such as weld sputtered particles and chips at the manufacturing of the undercarriage remains in the fuel tank.

The present invention has been developed in consideration of the above-mentioned problems, and it is therefore an object of the invention to provide a construction machine capable of making the most of a space of an undercarriage and of having a high-reliability fuel tank unaffected by rust, dust and crack of its structure.

DISCLOSURE OF INVENTION

For achieving this purpose, a construction machine according to the present invention is characterized by comprising an undercarriage having a hollow frame, a superstructure mounted on the undercarriage, and a fuel tank formed as one with the hollow frame in a state where a portion of an internal space of the hollow frame is defined as a compartment by partitions, with an internal surface of the fuel tank being covered with a resin film in a liquid-tight condition.

In addition, a construction machine according to the present invention is characterized by comprising an undercarriage having a hollow frame, a revolving superstructure rotatably mounted on the frame of the undercarriage, and a fuel tank formed as one with the hollow frame in a state where a portion of an internal space of the hollow frame is defined as a compartment by partitions, with an internal surface of the fuel tank being covered with a resin film in a liquid-tight condition.

The integrated formation of the fuel tank and the undercarriage made in this way realizes it possible to make the best use of the space of the undercarriage. Moreover, the liquid-tight covering of the fuel tank internal surface with the resin film prevents the occurrence of rust and the presence of the resin film prevents the tank fuel stored inside the resin film from flowing out to the external even in a case in which a crack occurs in an external surface of the fuel tank.

In this connection, preferably, this resin film is formed with a thermoplastic resin through the use of rotational molding. This prevents dust at the manufacturing of the undercarriage from remaining in the interior of the fuel tank because of being brought in the resin film in the resin formation stage, thus contributing to the improvement of reliability.

BEST MODE FOR CARRYING OUT THE INVENTION

Embodiments of the present invention will be described hereinbelow with reference to the drawings.

Figure 1:
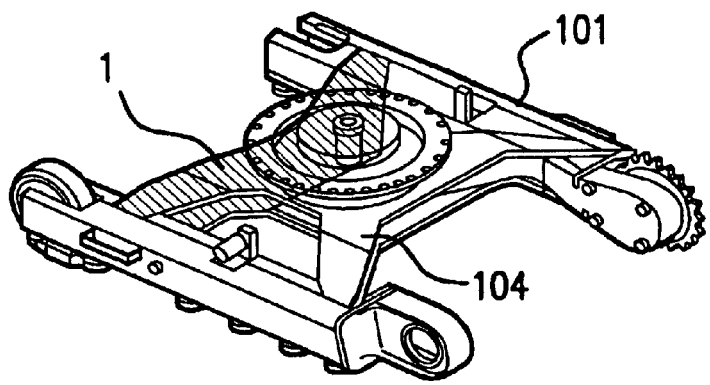
FIG. 1 is a perspective view showing an undercarriage of a construction machine according to a first embodiment of the present invention.
Figure 2A:
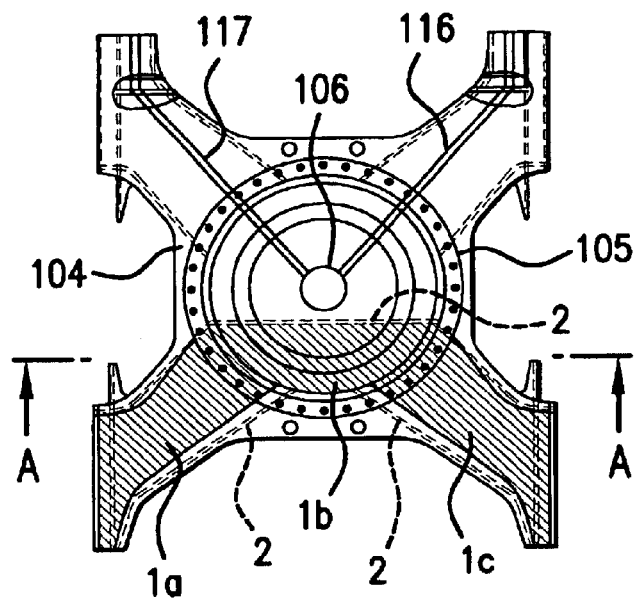
FIG. 2(a) is a plan view showing the undercarriage of the construction machine according to the first embodiment of the present invention.
Figure 2B:
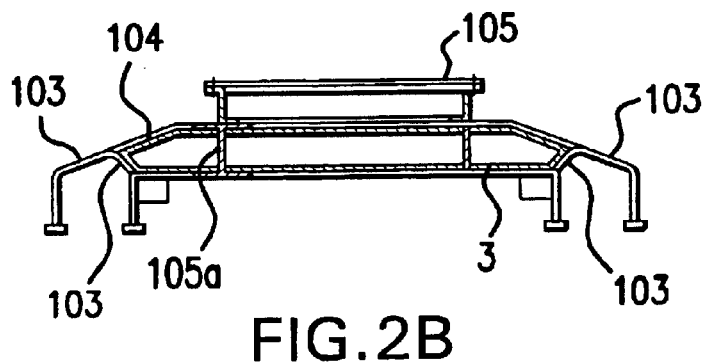
FIG. 2(b) is an illustration of the undercarriage of the construction machine according to the first embodiment of the present invention, and is a cross-sectional view taken along line A—A indicated by arrows in FIG. 2(a).
Figure 3:
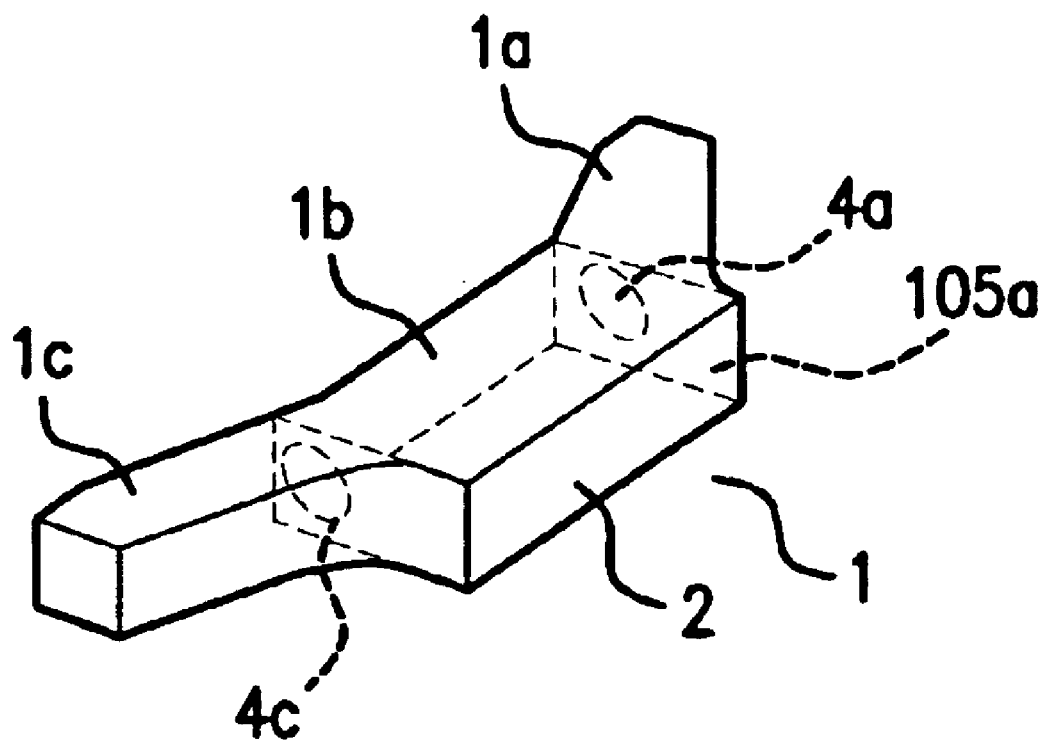
FIG. 3 is a perspective view showing a fuel tank according to the first embodiment of the present invention.

FIGS. 1 to 3 are illustrations of a construction machine according to a first embodiment of the present invention. FIG. 1 is a perspective view of an undercarriage thereof, FIGS. 2(a) and 2(b) are respectively a plan view and cross-sectional view showing the undercarriage thereof, and FIG. 3 is a perspective view showing a fuel tank formed on the undercarriage thereof.

In FIGS. 1 to 3, the parts similar to those in the conventional art described with reference to FIGS. 7 to 10 are marked with the same reference numerals, and a part of the descriptions thereof will be omitted.

Moreover, this embodiment relates to a hydraulic excavator (see FIG. 7) described in the conventional art, and the description of the entire construction of this hydraulic excavator will be omitted. Still moreover, In FIGS. 1 and 2(a), a portion corresponding to a fuel tank 1 is indicated by oblique lines for easy distinguishing.

As FIG. 1 shows, an undercarriage 101 of a construction machine according to this embodiment is equipped with a pair of upper and lower hollow main frames (frames) 104 placed in an opposed relation to each other, and a fuel tank 1 is formed in an internal space of the main frames 104 in a state integrated with the main frames 104.

In this connection, in the construction machine according to this embodiment, a steel-made main frame 104 is employed, which prevents big damage to the fuel tank 1 even if it receives a great shock from the external due to, for example, the collision against a rock during running.

The main frames 104 are made as frame plates placed upper and lower for firmly fixing the positional relationship between right and left truck frames 103 and 103, and the internal space defined by these frame plates produce a hollow condition. Moreover, in this internal space, as FIG. 2(a) shows, partitions 2 are set up for using a portion of the hollow space as the fuel tank 1.

Although running pipes 116 and 117 are placed in the main frames 104, the partitions 2 are formed in a space on the opposite side to the side of the running pipes 116, 117 to avoid the interference with the running pipes 116 and 117. That is, the partitions 2 are formed to cross the undercarriage 101 linearly at a position which does not interfere with the swivel joint 106.

Furthermore, in this fuel tank 1, as FIG. 3 shows, to make communications among three tank sections 1a to 1c separated by a side wall 105a of the swing circle 105, holes 4a and 4c are made in the side wall 105a of the swing circle 105 for making communications between the tank section 1a and the tank section 1b, and between the tank section 1b and the tank section 1c.

Still furthermore, as FIG. 2(b) shows, the internal surface of the fuel tank 1, surrounded with the main frames 104, the truck frames 103 and the partitions 2, is covered with a resin film 3 in a liquid-tight condition. For example, a component of this resin film 3 is a polyethylene or the like, and is formed in a rotational molding technique. That is, the resin film 3 is formed on the internal surface of the fuel tank 1 in a manner that, when manufactureing the undercarrigage 101, a powdered resin is put in the interior of the fuel tank 1 and is heated while the fuel tank 1 is in a rotated condition.

Accordingly, owing to the presence of the resin film 3, the fuel tank 1 is made to prevent the degradation of its internal surface stemming from rust and, further, is made to prevent the fuel stored internally from flowing out even if, for example, the construction machine collides against a rock during running and gets a great shock to create a crack in its external surface. Moreover, since the resin film 3 is formed by the rotational molding, dusts such as weld sputtered particles and chips appearing at the manufacturing of the undercarriage 101 are brought in the resin film 3 during the rotational molding so that they do not remain in the internal space of the fuel tank 1. This prevents the fuel stored from being contaminated by such dusts, thus realizing a good storage condition.

The undercarriage 101 of the construction machine according to the first embodiment of the present invention is made as described above and the fuel tank 1 is formed as one with the undercarriage 101; therefore, it is possible to make the most of the space of the undercarriage 101. Moreover, since the internal surface of the fuel tank 1 is covered with the resin film 3, it is possible to provide a high-reliability fuel tank capable of preventing the occurrence of rust, and further to prevent the fuel from flowing out even if a crack occurs its structure during working in a severe field. Still moreover, since the aforesaid resin film 3 is formed by the rotational molding, dusts arising at the manufacturing of the undercarriage 101 are brought in the resin film 3 at the formation stage of the resin film 3 to prevent the dusts from remaining in the interior of the fuel tank 1, thereby enhancing the reliability.

Figure 4:
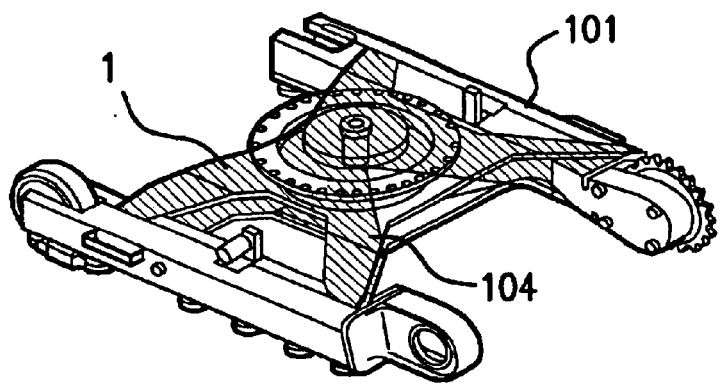
FIG. 4 is an illustration of an undercarriage of a construction machine according to a second embodiment of the present invention.
Figure 5A:
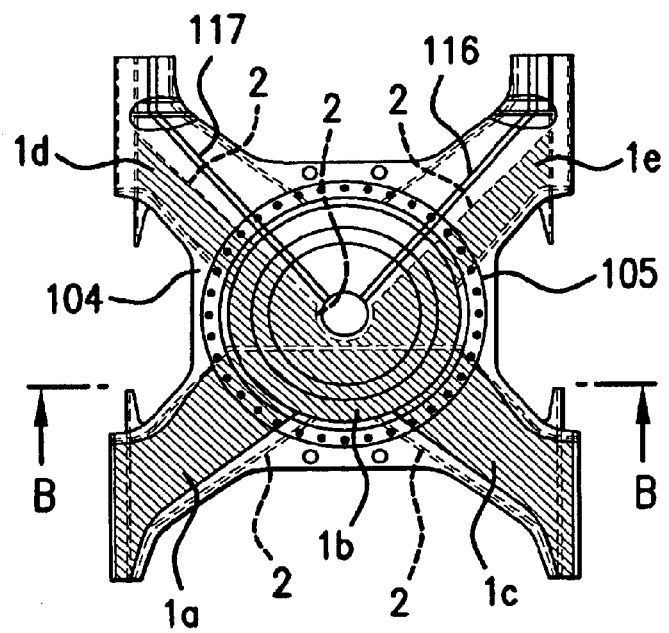
FIG. 5(a) is a plan view showing the undercarriage of the construction machine according to the second embodiment of the present invention.
Figure 5B:
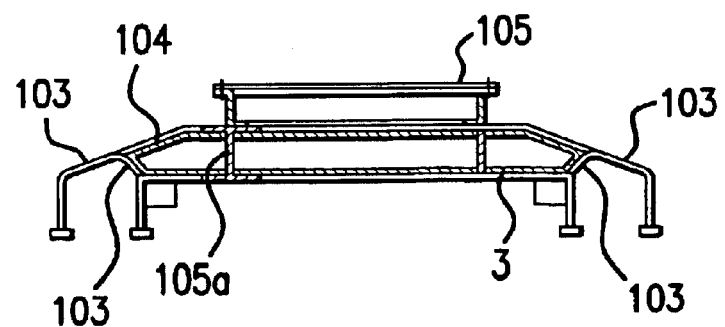
FIG. 5(b) is an illustration of the undercarriage of the construction machine according to the second embodiment of the present invention, and is a cross-sectional view taken along line B—B indicated by arrows in FIG. 5(a).
Figure 6:
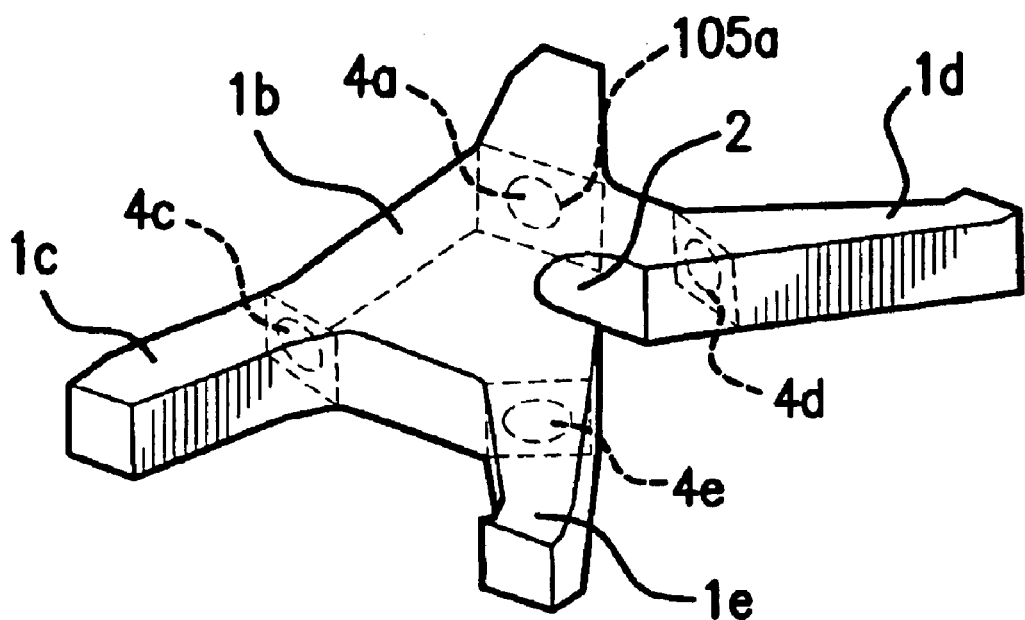
FIG. 6 is a perspective view showing a fuel tank according to the second embodiment of the present invention.
Figure 7:
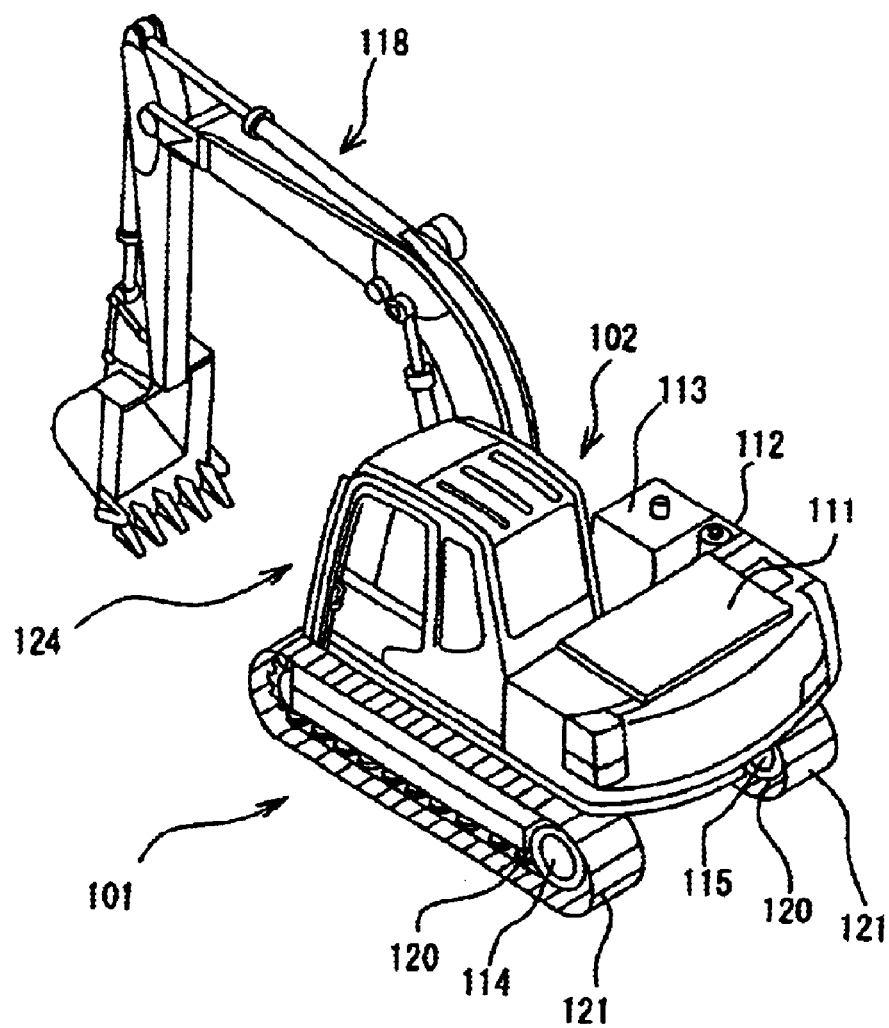
FIG. 7 is a perspective view showing a conventional construction machine.
Figure 8:
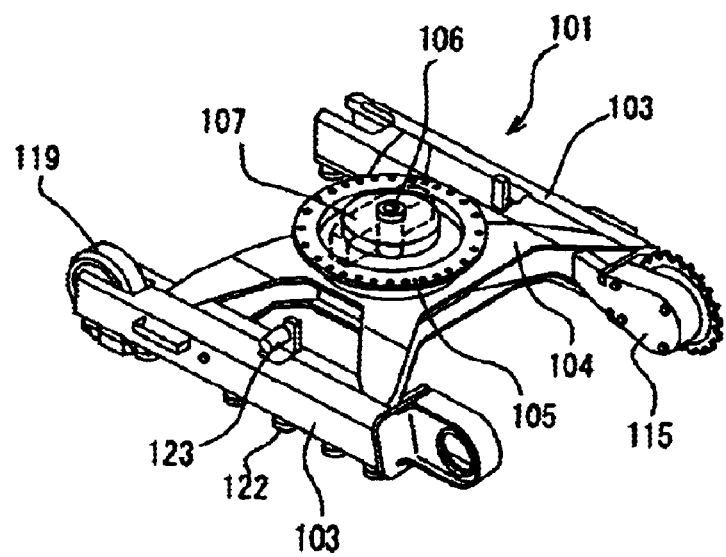
FIG. 8 is a perspective view showing an undercarriage of the conventional construction machine.
Figure 9:
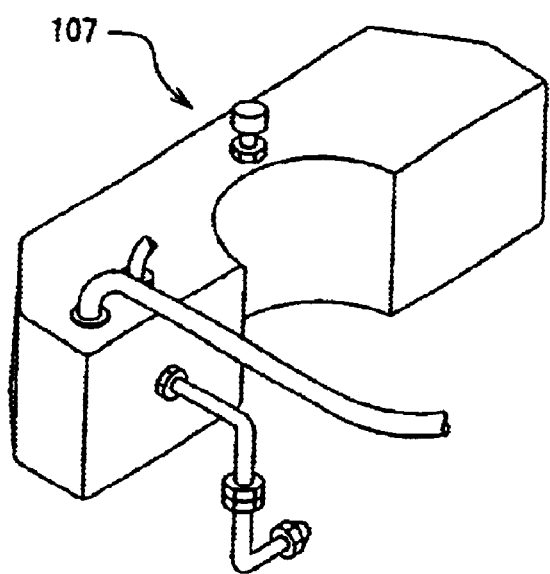
FIG. 9 is a perspective view showing a conventional fuel tank.
Figure 10:
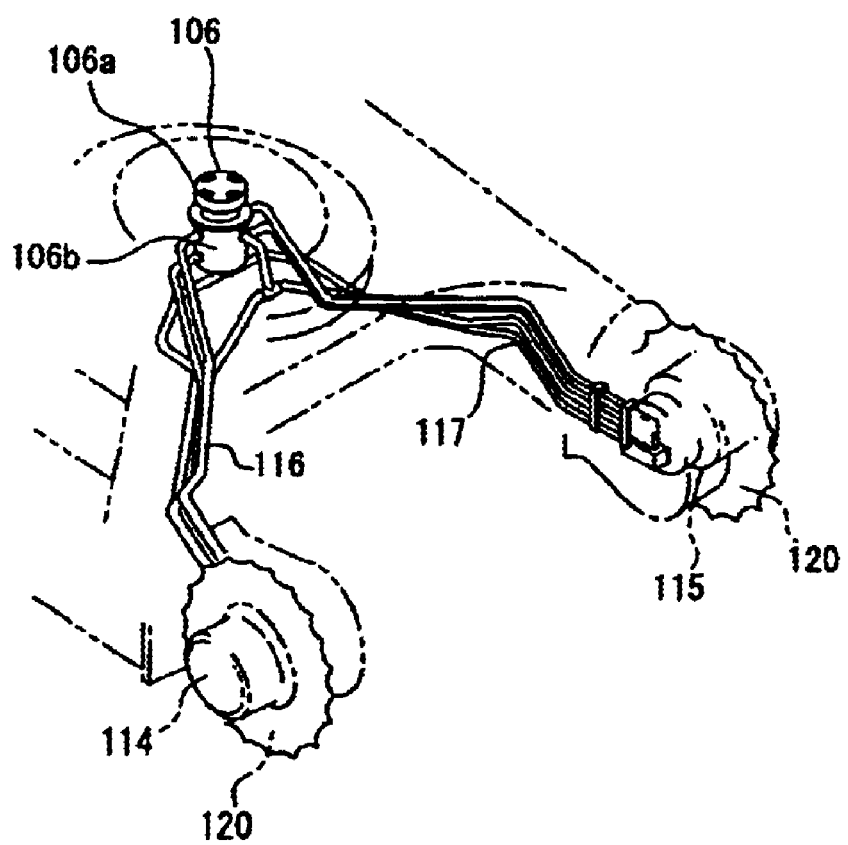
FIG. 10 is a perspective view showing an example representative of hydraulic piping between a running hydraulic motor and a swivel joint.

Secondly, a second embodiment of the present invention will be described with reference to FIGS. 4 to 6. FIG. 4 is a perspective view showing an undercarriage 101 of a construction machine according to this embodiment, and is an illustration corresponding to FIG. 1. FIGS. 5(a) and 5(b) are a plan view and cross-sectional view of the undercarriage 101, respectively, and are illustrations corresponding to FIGS. 2(a) and 2(b). FIG. 6 is a perspective view showing a fuel tank formed on the undercarriage, and is an illustration corresponding to FIG. 3. In FIGS. 4 and 5(a), the portion corresponding to a fuel tank 1 is indicated by oblique lines for easy distinguishing.

As FIG. 4 shows, in the undercarriage 101 of the construction machine according to this embodiment, the almost whole hollow space between main frames 104, except running pipes 116 and 117, is used for a fuel tank. That is, partitions 2 are placed along the running pipes 116 and 117 to surround the circumference of a swivel joint 106 (FIG. 5). Moreover, to make communications among tank sections 1a to 1e made by dividing the fuel tank 1 into five by a side wall 105a of a swing circle 105, four holes 4a, 4c, 4d and 4e are made in the side wall 105a to make communications between the tank section 1b and the each of tank sections 1a, 1c, 1d and 1e (see FIG. 6).

In addition, as in the case of the above-described first embodiment, a thermoplastic resin film 3 is formed on an internal surface of the fuel tank 1 by means of the rotational molding, and the construction other than this is also made similarly to that of the above-described embodiment.

Accordingly, in this embodiment, most of the space except the running pipes 116 and 117 is used as the fuel tank and the entire internal surface of the fuel tank 1 is covered with the resin, which realizes it possible to make the most of the space of the undercarriage 101 and providing a fuel tank unaffected by rust, dust and crack of its structure.

The present invention is not limited to the above-described embodiments, and it is intended to cover all changes of the embodiments which do not constitute departures from the spirit and scope of the invention.

For example, it is acceptable if only the partitions 2 of the fuel tank 1 are made to avoid the interference with members (including running pipes 116 and 117) accommodated inside the main frames 104, and these shapes are not limited to those of the above-described embodiment.

Moreover, although the material of the resin film 3 formed in the interior of the fuel tank 1 is required to have a durability which can prevent the flow-out of the fuel even if a crack occurs in the external surface of the fuel tank 1 defined by the main frames 104 and the partitions 2, it is not limited to that of the above-described embodiment. Still moreover, in addition to the polyethylene, various types of thermoplastic resins are also employable which can be formalized through the use of a method such as rotational molding.

Furthermore, in addition to the hydraulic excavator, the present invention is also applicable widely to construction machines comprising an undercarriage having hollow main frames and a revolving superstructure or an superstructure which does not particularly revolve with respect to the undercarriage.

Industrial Applicability

As described above, the present invention can improve the degree of freedom on the layout of a revolving superstructure while securing a sufficient volume of a fuel tank, and is extremely effective in enhancing the performance of the machine body.

What is claimed is:

1. A construction machine comprising:

an undercarriage including a swing circle, a pair of truck frames and a hollow frame, the undercarriage having at least two plates interconnecting each of said truck frames and the plates defining a hollow space between the plates;

a superstructure rotatably mounted on said swing circle of said undercarriage; and a fuel tank, for storing fuel, being formed in such a manner that the hollow space in said hollow frame is enclosed by partitions, said fuel tank comprising an internal surface covered with a resin film in a liquid-tight condition, and wherein the space between the plates is divided into at least two sections by at least one side wall, said at least one side wall having at least one hole for transfer of fuel.

2. A construction machine according to claim 1, wherein said resin film is formed with a thermoplastic resin by rotational molding.

3. A construction machine according to claim 1, said at least one side wall further comprising a plurality of walls, at least one of said walls being a side wall of said swing circle.

* * * * *